US007836454B1

(12) United States Patent
Coleman et al.

(10) Patent No.: US 7,836,454 B1
(45) Date of Patent: Nov. 16, 2010

(54) INFORMATION APPLIANCE ARCHITECTURE

(75) Inventors: Patrick J. Coleman, Burlingame, CA (US); Thomas E. Whittaker, San Mateo, CA (US); David C. W. Yip, Sunnyvale, CA (US); Mark A. Moore, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 0 days.

(21) Appl. No.: 11/341,275

(22) Filed: Mar. 19, 1999

Related U.S. Application Data

(63) Continuation of application No. 08/743,803, filed on Nov. 5, 1996, now Pat. No. 5,889,990.

(51) Int. Cl.
*G06F 13/00* (2006.01)
(52) U.S. Cl. .................................................. 719/312
(58) Field of Classification Search ................. 717/163; 719/312
See application file for complete search history.

(56) References Cited

U.S. PATENT DOCUMENTS

| | | | |
|---|---|---|---|
| 4,768,150 | A | 8/1988 | Chang et al. |
| 5,432,935 | A | 7/1995 | Kato et al. |
| 5,521,849 | A | 5/1996 | Adelson et al. |
| 5,553,286 | A | 9/1996 | Lee |
| 5,553,290 | A | 9/1996 | Calvert et al. |
| 5,557,798 | A | 9/1996 | Skeen et al. |
| 5,742,825 | A * | 4/1998 | Mathur et al. ............... 719/329 |
| 5,784,613 | A * | 7/1998 | Tamirisa ..................... 718/100 |

(Continued)

OTHER PUBLICATIONS

Wine (Windows Emulator) Frequently Asked Questions & Answers Version 3.11 by P. David Gardner URL: http://www.ibiblio.org/pub/historic-linux/ftp-archives/sunsite.unc.edu/Sept-29-1996/ALPHA/wine/Wine.FAQ.*

(Continued)

*Primary Examiner*—Andy Ho
(74) *Attorney, Agent, or Firm*—Marsh Fischmann & Breyfogle LLP; Kent A. Lembke; Jonathon A. Szumny (57) ABSTRACT

An architecture for an information appliance adapted for a specific application supports a variety of appliance personalities, relying on a single core technology. The information appliance comprises an application-optimized hardware platform, including a processor, a display coupled to the processor, an input/output device coupled to an information source and to the processor, a user input device, and working memory coupled to the processor. Non-volatile memory is coupled to the processor and stores appliance operating software and application software. The appliance operating software includes logic executed by the processor, which manages information flow from the information source through the working memory to the display, and the application software includes logic executed by the processor and responsive to the user input to manage selection of information from the information source. The appliance operating software includes an operating system kernel that is adapted for the processor, and a system library that includes logic providing an interface to the application software. An operating system service layer provides an abstraction function between the system library and the appliance operating system kernel and hardware, so that the logic in the system library and above, such as in the application itself, is executable with a development platform operating system which is completely different from the operating system of the appliance.

18 Claims, 7 Drawing Sheets

U.S. PATENT DOCUMENTS 5,987,517 A * 11/1999 Firth et al. .................. 709/230
6,684,261 B1 * 1/2004 Orton et al. ................. 719/328

OTHER PUBLICATIONS

Levendel Y., "Software Assembly Workbench: how to construct software like hardware", Proceedings. International Computer Performance and Dependability Symposium. IEEE Comput. Soc. Press. pp. 4-12, 1995.

"Microsoft Windows CE: The New Choice for Dedicated Systems", Microsoft Corp. (May 1997): Online. MSDN CD, 1997.
Gardner, P. David, "Wine (Windows Emulator) Frequently Asked Questions & Answers," Version 3.11, Apr. 1996, online, http://www.ibiblio.org/pub/historic-linux/ftp-archives/sunsite.unc.edu/Sep-29-1996/ALPHA/wine/Wine.FAQ (retrieved Oct. 28, 2005).
Supplemental European Search Report, Nov. 14, 2005 (2 pages).
Communication from the European Patent Office, Feb. 14, 2006 (6 pages).

* cited by examiner

INFORMATION APPLIANCE ARCHITECTURE

This is a continuation of application Ser. No. 08/743,803, filed Nov. 5, 1996, now U.S. Pat. No. 5,889,990 now allowed.—all of which are incorporated herein by reference.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to an architecture for development and implementation of easy-to-use, low cost appliances, targeted at connecting average consumers to emerging on-line information services and other information sources.

2. Description of Related Art

Using computers, individuals are able to access a tremendous amount of information. With the emergence of information sources accessible through the Internet, such as web sites in the World Wide Web, and of local information sources, such as CD-ROMS, which are capable of storing entire libraries of information, more and more people are relying on their personal computers as a technique for gathering information. However, personal computers have been designed with general purpose architectures. Therefore, they have a wide variety of resources available in the architecture, which may not be necessary for a given application of the personal computer. The general purpose nature of personal computers keeps the cost of these systems high. Thus, if an individual uses a personal computer only for the purpose of gathering information from a CD-ROM, without taking advantage of a wide variety of other applications for which the personal computer is intended to work, then resources in the personal computer will be wasted.

Thus, it is desirable to provide special purpose platforms for data processing applications, such as retrieving information. However, the development of applications for special purpose platforms is often an intensive design effort. On the other hand, general purpose platforms support mature development tools to make application design efficient.

Thus, it is desirable to provide technology that enables the development and implementation of function-specific software applications that are matched to application optimized hardware platforms.

SUMMARY OF INVENTION

According to the present invention, a new class of consumer appliances for homes, schools, and offices is developed which blend the intuitive ease of use, convenience and affordability of consumer appliances with the power of computers having special purpose hardware platforms, in order to make electronic information far more accessible to consumers. Thus, the present invention can be characterized as an architecture for an information appliance adapted for a specific application. The architecture supports a variety of appliance personalities, relying on a single core technology. The core technology is designed to enable development of the appliance architecture software on a general purpose computer, relying on the vast store of software development tools and techniques available for general purpose platforms. A completed function-specific application matched to the application optimized hardware platform for the appliance is thereby provided.

The present invention can also be characterized as an information appliance which comprises an application optimized hardware platform, including a processor, a display coupled to the processor, an input/output device coupled to an information source and to the processor, a user input device, and working memory coupled to the processor. Memory is coupled to the processor and stores appliance operating software and application software. The appliance operating software includes logic executed by the processor, which manages information flow from the information source through the working memory to the display, and the application software includes logic executed by the processor and responsive to the user input to manage selection of information from the information source. The information source comprises in one aspect Internet accessible information, the appliance operating software includes Internet access logic, and the application software includes an Internet browser. In an alternative embodiment, the information source comprises a mass storage device, such as a CD-ROM. In this aspect, the application software comprises a CD-ROM interactive program for retrieving and presenting information on the display to the user. In another embodiment, the information source comprises Internet accessible electronic mail, and the application software includes electronic mail logic.

The display, according to the application optimized hardware, includes one of a variety of monitor technologies, such as standard television monitors (NTSC or PAL), liquid crystal displays (LCDs), and bitmap monitor displays, such as VGA.

The appliance operating software includes an operating system kernel that is adapted for the processor and a system library that includes logic providing an interface to the application software. An operating system service layer provides an application-to-platform abstraction function so that the logic in the system library and above, such as in the application itself, is executable with both the operating system kernel and a development platform operating system which is completely different from the operating system kernel of the appliance. In this way, the application is developed using an application foundation based on the system library, in a development platform, and automatically transferred to an appliance architecture with modification only in the operating system service layer. The only change needed in the code for it to run on a development platform is in the appliance operating system service layer module. The operating system service layer module for the appliance architecture is replaced by a development platform operating system service layer module so that any dissimilarities between the appliance and the development platform are localized at a single module in the code. Accordingly, an application development platform is provided by which a variety of information appliances can be designed on general purpose hardware and implemented on application-specific hardware. This vastly reduces the development time, and the hardware cost for special purpose information appliances, such as web browsers, CD-ROM library browsers, electronic mail appliances, and the like.

In one embodiment, the present invention is characterized as an information appliance which has an appliance hardware architecture that includes at least one input/output device by which information from an information source is provided to the information appliance, a display, a processor, and memory. An appliance operating system software is provided according to the hardware architecture. An appliance program includes logic responsive to user input which manages retrieval of information from the information source and display of the retrieved information. A system library module includes an application interface, memory management resources, process control resources and input/output device call resources. The memory management resources are accessible by the application program through the application interface, and provide management of the memory in the hardware appliance. The memory management resources include information caching logic for information retrieved from the information source. The process control resources are accessible by the application program through the application interface and provide for control of processes used by the application program through the appliance operating system. The input/output call resources are also accessible by the application program through the application interface and provide for communication with input/output devices in the hardware appliance architecture. A device driver library is coupled with the system library module and provides device independent interface logic to the application program which makes input/output calls. An appliance operating system service module is coupled with the system library module and provides an abstraction function between the system library module and the appliance operating system on the appliance hardware architecture, so that the application program, system library module, and device driver library are operable on a variety of operating systems. Thus, the code in the application program that relies on these modules, runs on a development platform in essentially the same way as it runs on the appliance architecture.

The memory management resources, according to another aspect of the present invention, are implemented at the system library level, in order to take advantage of the nature of the special purpose information appliance architecture. Thus, at the system library level, a memory caching algorithm is implemented with least recently used (LRU) memory that allows for management of system memory in the special purpose appliance architecture by software in the application foundation. The caching at the application foundation level takes advantage of the nature of the appliance as a source of information. Because the information sets accessible at web sites and through CD-ROMs and other types of information sources, are generally replaceable, LRU algorithms can be used which discard incoming information to the appliance, without complex management of such information in the application layer code. Again, this greatly reduces the complexity of the application development process, and optimizes the utilization of the hardware resources in the appliance architecture.

The present invention can also be characterized as a method for developing an application program for an information appliance which manages retrieval of information from an information source and display of the retrieved information on the information appliance. The information appliance has an application optimized appliance hardware architecture as described above. The method comprises the steps of providing on a development workstation, a system library module, a device driver library, and an operating system service module of the format discussed above. The operating system service module provides an abstraction function between the system library module and higher layer modules and the development workstation. Next, the method includes developing the application program on the development workstation, using the system library module and the device driver library. Next, the method comprises replacing the operating system service module on the development workstation with an appliance operating system service module, which provides an abstraction function between the system library and the appliance operating system on the appliance hardware architecture. Finally, an executable version of the application program is generated for the appliance operating system on the appliance hardware architecture using the appliance operating system service module.

Accordingly, the appliance architecture of the present invention provides a complete solution to the problem of development of special purpose, low-cost information appliances encompassing hardware, system software, and applications. The technology enables the creation of a new generation of easy to use low cost appliances targeted at connecting average consumers to emerging information services.

Other aspects and advantages of the present invention can be seen upon review of the figures, the detailed description, and the claims which follow.

DETAILED DESCRIPTION

A detailed description of embodiments of the present invention is provided with respect to the figures.

Figure 1:
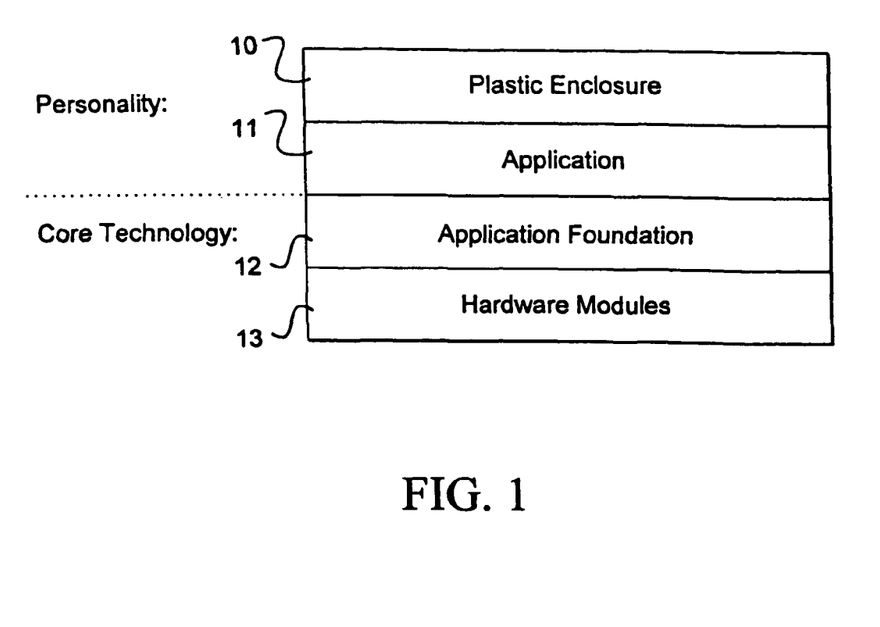
FIG. 1 is a conceptual diagram of the information appliance architecture according to the present invention.

FIG. 1 illustrates the concept of a information appliance architecture, according to the present invention. The architecture provides function-specific software applications that are matched to application-optimized hardware platforms. Rather than focusing on "general purpose", each information appliance is a single purpose computer-like appliance created to deliver a specific application. Because the information appliances are function-specific, each category of a device requires a different combination of hardware and software capabilities as illustrated in FIG. 1. Thus, the personality of the information appliance includes an enclosure, such as a plastic ornamental design appliance enclosure 10, and an application software module 11. The core technology of all information appliances is based on an application foundation 12 and hardware modules 13, which are coupled with the application foundation according to a specific hardware platform.

For example, while one information appliance requires a processor with a high MIPS (million instructions per second) rating, an ISDN connection, and a television output, another appliance requires less computational power, an LCD screen, and a touchpad. Every appliance has the application foundation 12, a central processor, and some amount of memory at the core. However, each individual application varies in the connectivity, output, and user interface appropriate for the application.

In order to easily match different processors with different memory arrangements, different connectivity and different output options, a set of hardware modules is provided. Each appliance is constructed using the hardware modules from the basic design platform. The hardware components used in each design are provided by semiconductor manufacturers in typical systems, to provide I/O devices, processors, memory, and other glue logic necessary for the particular hardware appliance architecture. Hardware logic interface modules are based on a 'busless' design. Rather than create a bus architecture which adds complexity and cost, and inevitably becomes a design bottleneck, low level logic designs are used for interfacing different combinations of microprocessors, memory and I/O devices.

Figure 2:
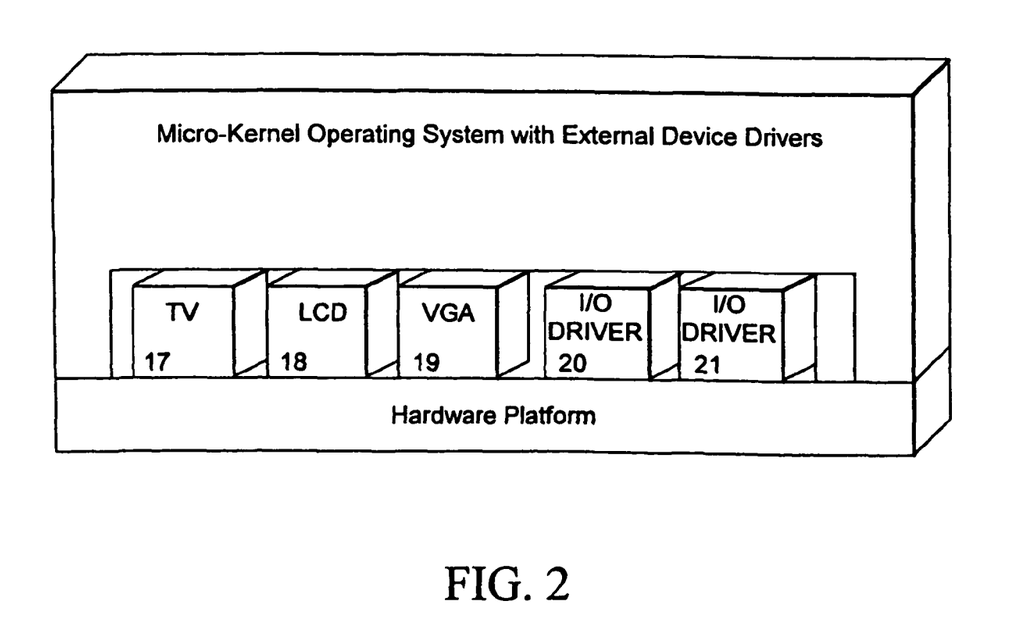
FIG. 2 is a schematic diagram of an appliance board support package, including a client operating system kernel, according to the present invention.

Key to making the modules fit together are external device drivers (EDD) which allow the hardware modules to be directly interfaced with one another. The EDDs are controlled and managed by the operating system, and interface with the hardware to the application foundation software. The integration of the EDDs with an operating system forms a complete board support package (BSP), as illustrated in FIG. 2. Thus, the BSP includes a hardware platform, and a microkernel operating system with external device drivers, such as a television driver 17, a liquid crystal display (LCD) driver 18, a VGA graphics driver for a computer monitor 19, and generic I/0 drivers 20 and 21, such as used for accessing the Internet, CD-ROM drives, or other sources of information.

Figure 3:
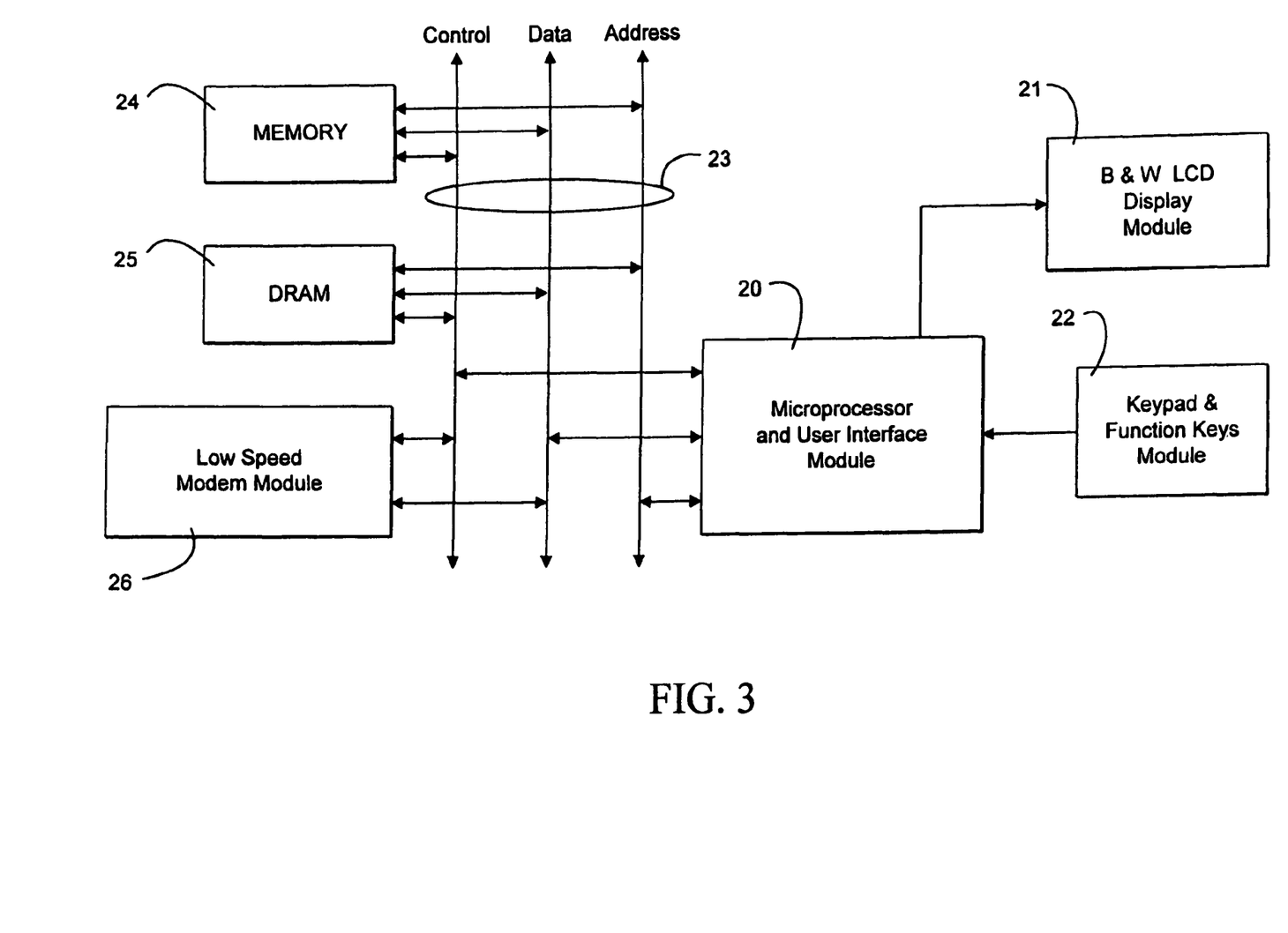
FIG. 3 is an example of a hardware platform for an electronic mail appliance.
Figure 4:
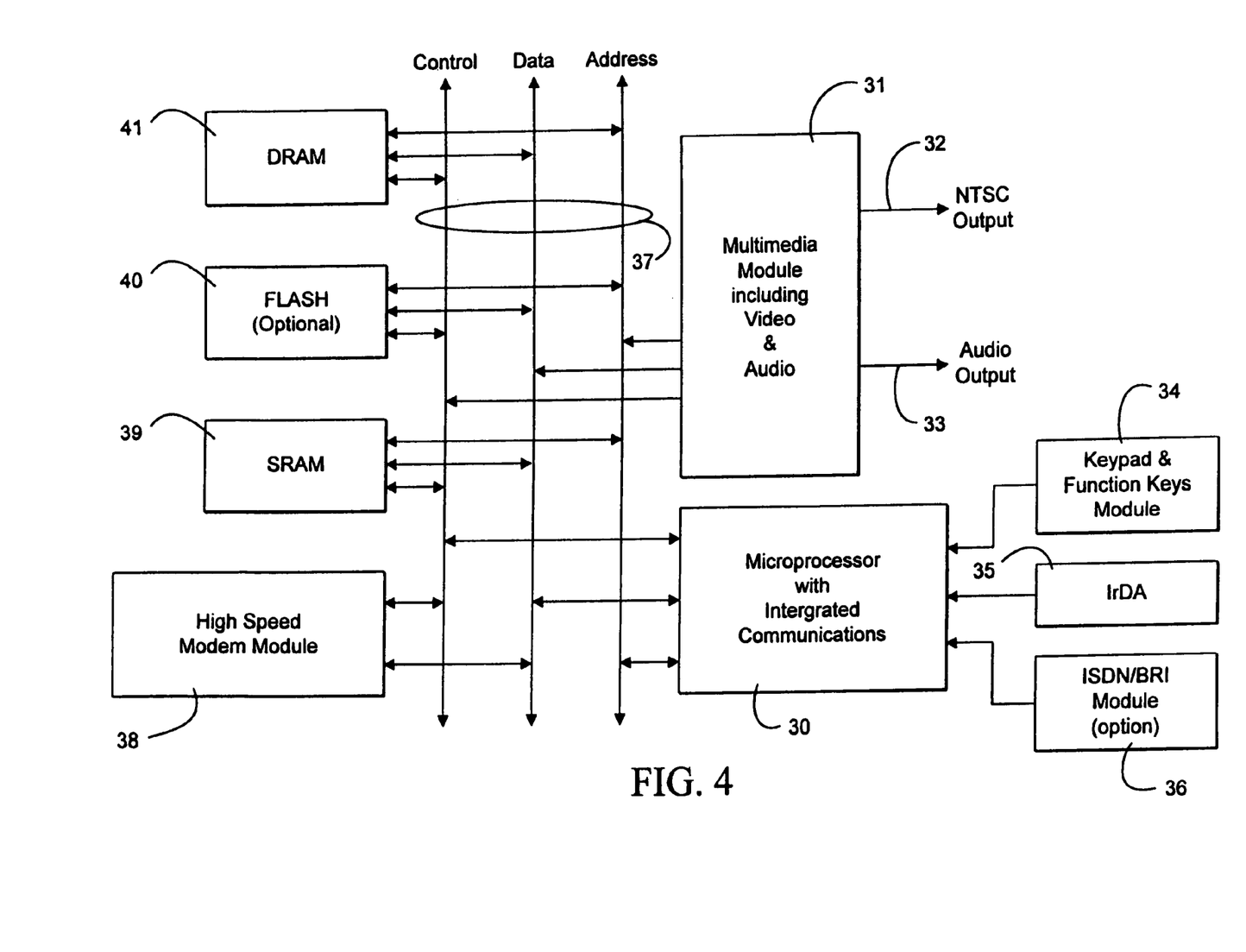
FIG. 4 is an example of a hardware platform for an Internet appliance.

FIGS. 3 and 4 provide examples of hardware architectures for information appliances according to the present invention. In FIG. 3, an example platform for an electronic mail appliance is shown. The platform implements a fully functional email application on a low cost, small footprint device. It incorporates a moderate performance processor, in the microprocessor and user interface module 20, coupled with a black and white LCD display and display module 21. A keypad and function keys module 22 is coupled with the microprocessor 20 to provide user input. Control, address, and data lines 23 are coupled to a memory 24, such as SRAM or a flash memory, a working memory 25, such as DRAM memory, and an 110 module, such as a low speed modem module 26.

FIG. 4 provides an example Internet platform built to implement a fully functional web browser application on a moderate cost, small footprint device. The platform provides a high performance processor in a microprocessor with integrated communications module 30. A NTSC television output is generated in a multimedia module that includes video and audio support hardware 31. Thus, the multimedia module 31 generates NTSC output on line 32 and audio output on line 33. A keypad and function key module 34 is used to provide user input. Also, an infrared remote control device adapter 35 allows user input across an IR handheld remote. An optional high speed networking protocol module, such as an ISDN/BRI module 36, may be included with the system. Control, data, and address lines 37 are coupled to the multimedia module 31 and the microprocessor 30. These provide connection to a high speed modem module 38, working memory 39, optionally non-volatile memory 40, and high speed dynamic random access memory (DRAM) 41, for use in the browsing application.

Additional platforms can be assembled readily using different combinations of hardware modules and processors. The application foundation architecture, according to the present invention, is completely hardware independent, so any change to the hardware requires only simple changes to the board support package that do not propagate up through the application software.

Figure 5:
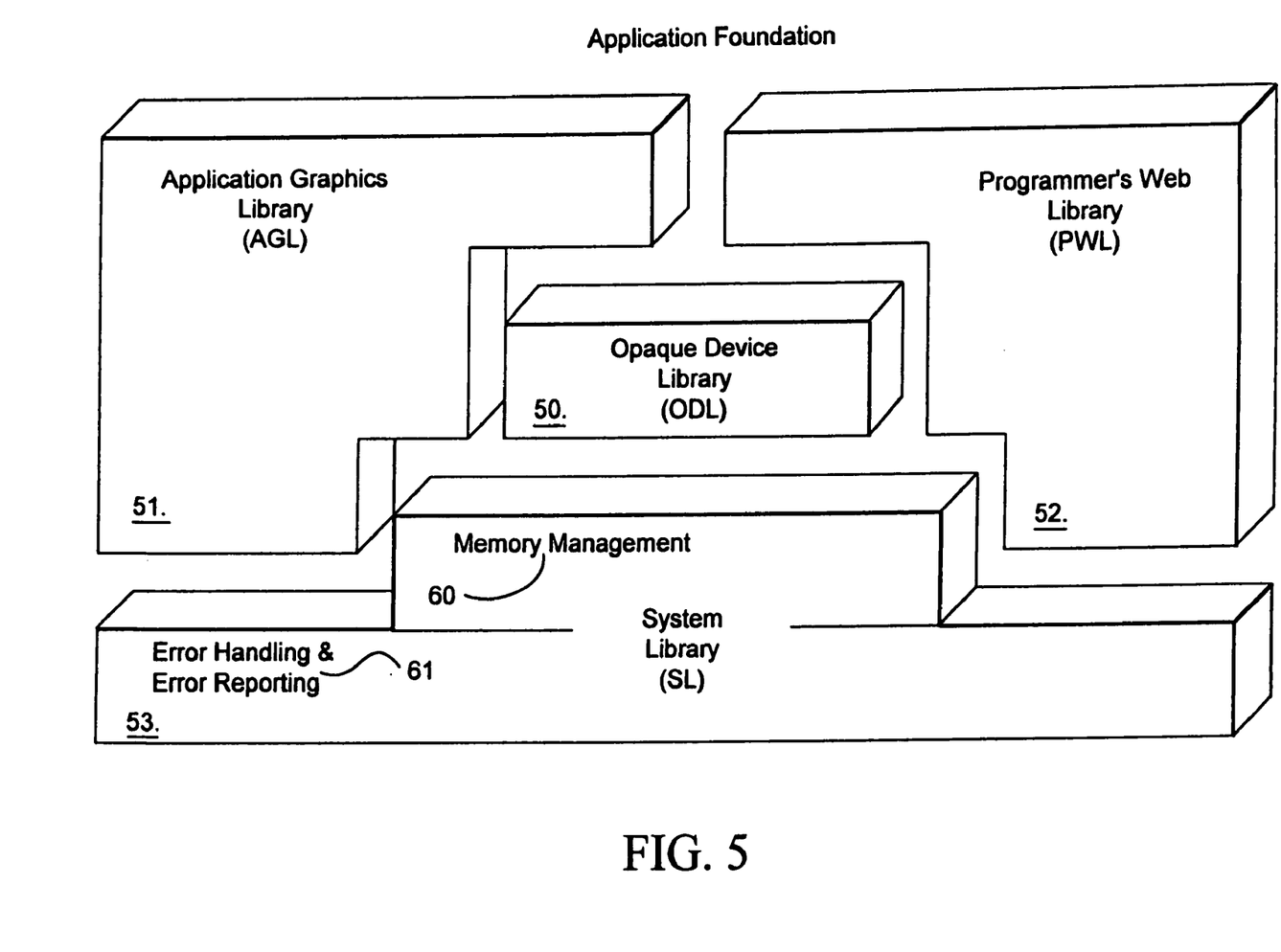
FIG. 5 is a simplified diagram of application foundation software for use with the board support package of FIG. 2.

FIG. 5 illustrates the application foundation, the first platform designed for the creation of information appliances. The application foundation is small, in the neighborhood of 300K bytes, and has been optimized to be both high performance and robust enough to support any information appliance software application. Further, since each application will require its own optimized hardware, the environment is portable, to allow the developer to move from one platform to another.

The application foundation is primarily composed of the opaque device library (ODL) 50, the application graphics library (AGL) 51, the programmer's web library (PWL) 52, and the system library (SL) 53, and supported by an operating system services layer that provides an application foundation to platform abstraction function.

Opaque Device Library (ODL) 50

The opaque device library (ODL) 50 is the interface used for interacting with external device drivers. ODL 50 is a single 'file-like' interface which provides a powerful mechanism for dealing with any communications, input or storage device. All devices are accessed using the same interface and therefore can be swapped without any need to alter the application code, allowing ODL 50 programmers to substitute devices seamlessly.

The preferred implementation of the ODL 50 supports the following devices, with more used in alternative embodiments:

Network connections (POTS, ISDN, TI, E1, Ethernet, broadband, wireless)
  Input devices (keyboard, mouse, IR remote control, touchscreen)
  Storage devices (CD-ROM, Hard Drive, Floppy Drive, Flash memory devices, IrDA, PCMCIA)

Application Graphics Library (AGL) 51

The application graphics library (AGL) 51 is the interface used for drawing and displaying images. The AGL 51 is designed to support a variety of display devices including VGA, LCD, TV (NTSC and PAL) and even aspects of other display peripherals such as LCD touchscreens. The primary components of the AGL are a 2D drawing package, an image drawing package, support for GIF and JPEG images (progressive and non-progressive), plus windowing and cursor control.

AGL 51 can be configured to support any display type when the application is linked. The link-time configuring of AGL 51 exchanges information with the low level graphics EDD for the display device selected. The EDD gives AGL 51 added information about the display environment, allowing AGL 51 to optimize the output for the best possible appearance. All enhancements delivered by AGL 51 appear without changes to the application graphics or programmable interfaces. Only the screen size and font size need to be adjusted in the application.

Programmer's Web Library (PWL) 52

Almost every application developed can benefit from access to World Wide Web content. The programmer's web library (PWL) 52 gives the application programmer a tool kit for parsing URLs and making HTTP requests. PWL 52 will also parse HTML content and return the 'marks' back to the application program. The application program is only responsible for properly formatting and displaying the content.

Note, all HTTP requests are made via ODL 50, so content can be accessed whether it is stored locally (for example on a CD-ROM) or on remote server (via a network connection).

System Library (SL) 53

The System Library (SL) 53 provides the application program with system infrastructure support. Two primary support functions provided by SL 53 are memory management 60 and error handling 61.

Memory Management 60: Typical appliances are required to operate with tight memory since most devices will have limited physical memory and no virtual paging. SL 53 handles memory fragmentation, removes items from memory that are no longer needed, and enables the application to recreate or reload segments.

The memory management component 60 of the application foundation is constructed around 3 categories of memory:

System memory, which is for data which is permanent or data that has a long lifetime.

Program memory, which can be categorized as relocatable or non-relocatable and is data that may come and go as the application executes.

LRU memory, which is data that can be recreated or reloaded at any time.

By classifying memory according to these categories, different algorithms can be applied to keep memory compact, allowing for full optimization of memory resources. (See FIG. 9) All elements in the application environment (AGL, PWL, ODL, etc.) utilize the memory management component.

Error Handling 61: There are two basic error mechanisms included in the development environment—user errors and system exceptions.

User errors are handled by a 'catch and throw' error mechanism and allow the application to display an error message using Unicode error messages.

System exceptions are unexpected program errors. Program errors are specified using a number and can be displayed using special error formatting routines. The error formatting routines use a Unicode version of the error messages.

All error messages can be translated to any language, and are loaded into the application at build time.

Figure 6:
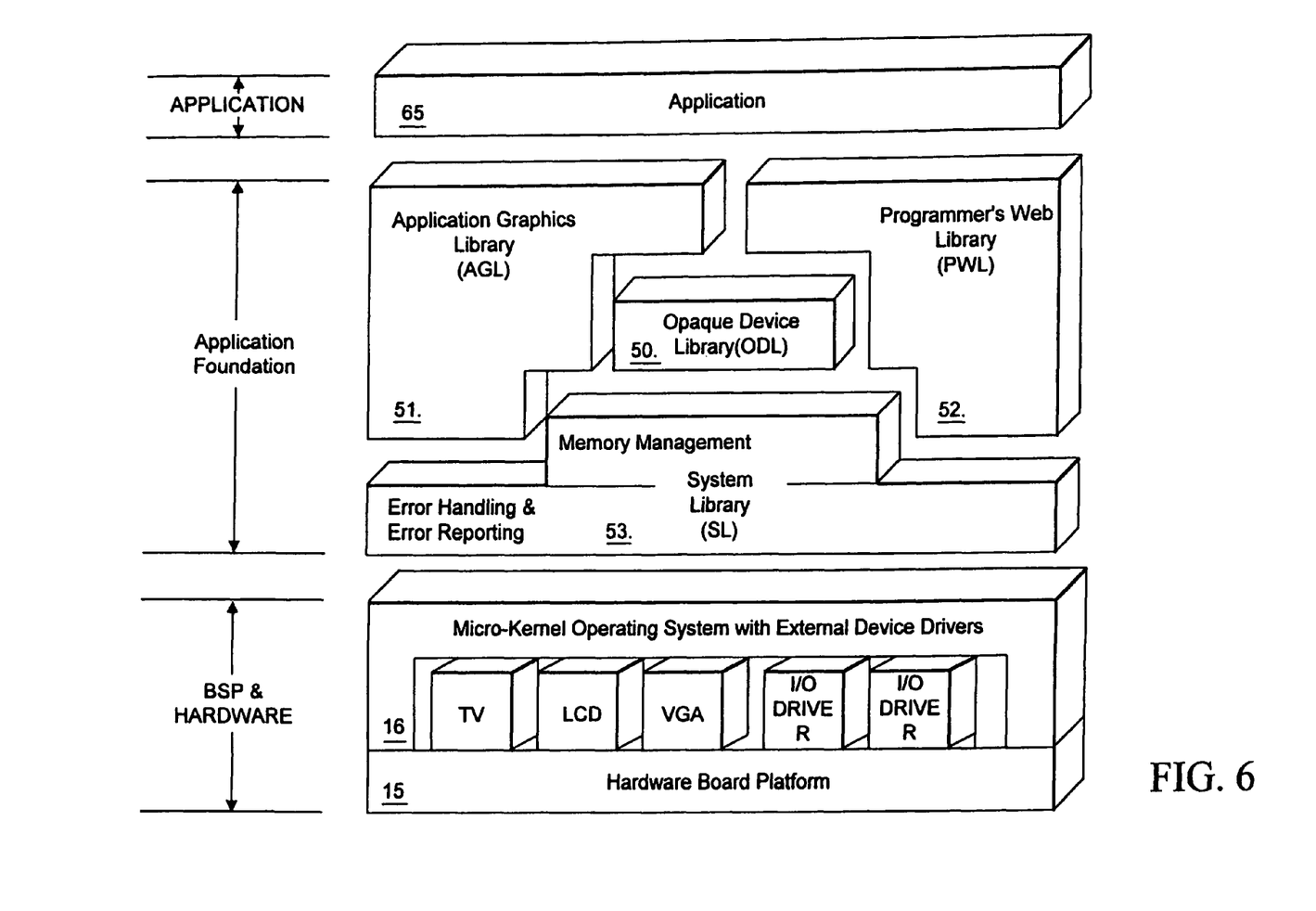
FIG. 6 is a simplified diagram of a complete information appliance architecture according to the present invention.

FIG. 6 provides a summary view of the complete information appliance architecture including hardware, system software, and applications. The reference numbers used in FIG. 6 are the same as those used in FIGS. 2 and 5. An information appliance application 65 sits on top of the foundation to provide a completed information appliance.

Figure 7:
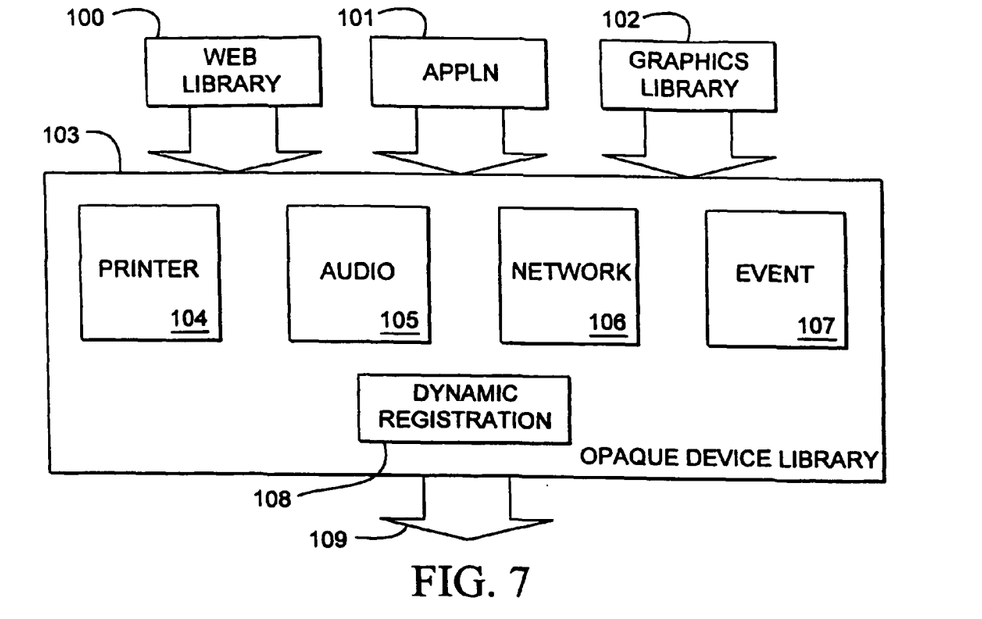
FIG. 7 is a diagram of the opaque device library (ODL) layer of the application foundation of the present invention.

FIG. 7 provides a simplified diagram of the ODL 50 layer of the present invention. The ODL is coupled to the web library 100, the application program 101 for this specific appliance and the graphics library 102. The ODL 103 includes printer functions, 104 audio functions, 105 network functions, 106 event functions 107 and other device-type modules to provide a unified interface to the application program for the devices. Also the ODL 103 includes dynamic registration functions 108 so that the application layer 101 is provided an interface to any device, like a network interface, a display, a sound chip, or a touch screen through a common interface. The ODL 103 is coupled as indicated at 109 to operating system-specific functions in the operating system service layer, as discussed below, and to the operating system, as suits the particular function being executed. Also, it is supported by the system library, shown in FIG. 8.

The event component 107, for example, includes an event directory that includes an event data file. Blocking or non-blocking functions are utilized for reading the event file. The application layer 101 is able to read the event data file, either with a blocking or non-blocking function. If the application, for example, has nothing to do except wait for an event, then it will do a blocking read and wait for the event. Otherwise, non-blocking reads can be utilized. The blocking read to the event data file is based on an operating system service layer queue function in order to save processing cycles and provide efficient blocking functions.

The network component 106 is based on a network directory which the application is capable of reading and writing to. Through the network block 106, the application program is provided an interface to the actual I/O device driver at lower layers of the design.

Similarly, the audio component 105 provides a unified interface for the application program 101 for various types of audio files, such as "wave files" and other standard files, such as .aiff files and the like.

A printer component 104 and other files, such as scanners, touch-screens, and the like, can be added to the ODL 103, as suits the particular implementation of the invention. The ODL 103 provides a unified set of functions by which the application 101 is capable of opening the file and performing read and write operations to the devices on the appliance hardware platform, while being isolated from the actual device drivers by means of the unified ODL layer 103. For the network module 106, for example, ODL functions include a command for opening a network connection, and providing a pipe from the application to the network interface driver. For the audio file 105, the ODL 103 includes functions which detect file type for the audio data, and to play the file.

Thus, the ODL provides an interface for interacting with I/O devices. The ODL is a single file-like interface which provides a powerful mechanism for dealing with devices. All devices are accessed using the same paradigm and therefore, can be swapped without application code requiring significant change. For instance, a modem can exchanged with a CD-ROM device and the application would not have to change. Normally, this would require code being changed for a protocol, like TCP/IP, to a series of system calls.

The standard interface to all these devices is file-like. There is directory hierarchy that represents all the available resources to an application. At run time, an application can traverse through the directory tree to see what resources it has available to it. Using simple file open read, read/write, and close calls, an application can accomplish all its I/O requirements. The information that is written or read from the files is device-type independent, in order to meet the requirements of supporting a wide range of devices.

The ODL is also integrated with application's graphics library, to provide asynchronous image display, that is displaying of an image while it's being downloaded.

In one embodiment, the ODL system is based on a file descriptor table that stores all file-specific data types and state information. Read, write, open, close, and flush operations are performed by file-type specific routines, for which there is a function pointer to the file descriptor table. Events are handled in an event table in the ODL, providing one file where user events are found. In order to receive user input, an application must open the data file in the events directory and perform read operations on that file. The data file is a read-only file containing user events ranging from input from an infrared remote to a standard keyboard input. This file is read-only because user events are strictly an input to the system.

To access the ODL, the application program uses functions including, for example, the following:

| | |
|---|---|
| OPEN | |
| Syntax: | sword odlOpen(char * sourcePath, ub4 access); |
| Function: | This function is used to open an odl file. A call to odlOpen will perform the following operations: |
| | 1. Verify that the file trying to be opened is a valid resource. |
| | 2. Verify that the resource is available. |
| | 3. Get the next free entry into the odlFDT. |
| | 4. Call the corresponding open routine for the device. |
| | 5. Store device specific function pointers, device fd, and status info in FDT. |
| Input: | sourcePath - User supplied path to file to open. |
| | ub2 - Access privileges to file such as read, write, read and write, etc. |
| Output: | None |
| Return: | A positive number will indicate successful completion of the call and will be the file descriptor for accessing the open file. A negative number will indicate an error code. |
| CLOSE | |
| Syntax: | sword odlClose (uword fd); |
| Function: | This function is used to close an odl file. A call to od1Close will perform the following operations: |
| | 1. Verify that the fd is valid. |
| | 2. Call the close function that is referenced in the FDT for this entry. The fd will be replaced with the fd found in the main FDT for this instance of this device. |
| | 3. Return the return code that was returned from call to device specific flush operation. |
| Input: | fd - File descriptor of file to be closed. |
| Output: | None |
| Return: | A "0" is returned if successful. A negative error code is returned if not successful. |
| READ | |
| Syntax: | sword odlRead (uword fd, void * buf, uword n, uword * flag); |
| Function: | This function is used to read from an odl file. A call to odlRead will perform the following operations: |
| | 1. Verify that the fd is valid. |
| | Verify that the file is-readable. |
| | Call the read function that is referenced in the FDT for this entry with the buffer |
| | and size passed in by the calling procedure. The fd will be replaced with the fd found in the main FDT for this instance of this device. |
| Input: | fd - File descriptor of file to be read. |
| | buf - User provided ptr to buffer for data to be transferred into. |
| | n - Maximum number of bytes to be read. |
| | flag- Set to null if caller function does not want this variable set to done when operation is complete. Otherwise, points to valid uword indicating this variable should be updated on job completion. Only supported by certain file types. |
| Output: | buf - Contains data read from file. |
| Return: | Zero indicates that file is empty. A positive number represents number of bytes put in buf. A negative number indicates an error and represents an odl error code. |
| WRITE | |
| Syntax: | sward odlWrite (uword fd, const void * buf, uword n, uword * flag); |
| Function: | Write to an odl file. A call to od1Write will perform the following operations: |
| | 1. Verify that the fd is valid. |
| | 2. Verify that the file is writeable. |
| | 3. Call the write function that is referenced in the FDT for this entry with the buffer and size passed in by the calling procedure. The fd will be replaced with the fd found in the main FDT for this instance of this device. |
| | 4. Return the return code that was returned from call to device specific write operation. |
| Input: | fd - File descriptor of file to be written. |
| | buf - User provided ptr to buffer of data to be written to file. |
| | n - Number of bytes to be written to file. |
| | flag - Set to null if caller function does not want this var set to done when operation is complete. Otherwise, points to valid uword indicating this var should be updated on job completion. Only supported by certain file types. |
| Output: | None |
| Return: | A positive number indicates number of bytes written to file. Negative numbers indicate an error and represent an odl error code. |

-continued

WAIT

| | |
|---|---|
| Syntax: | sword odlWait (uword fd, const void * buf, uword n, uword timeOut); |
| Function: | Wait for an I/O access. This function provides a means for the calling process to block on I/O read operations. A call to odlWait will perform the following operations:<br>1. Verify that the fd is valid.<br>2. Verify that the file is readable.<br>3. Call the Wait function that is reference in the FDT for this entry. The fd will be replaced with the fd found in the main FDT for this instance of this device.<br>4. Return the return code that was returned from the call to device specific wait operation. |
| Input: | fd - File descriptor of file to be read.<br>buf - User provided ptr to buffer for data to be transferred into.<br>n - Maximum number of bytes to be read.<br>timeOut - Time out value specified in milliseconds. If set to 0 indicates to block until read is complete. |
| Output: | Buf - Contains read data unless function timed out. |
| Return: | Positive number indicates data read in bytes. Zero indicates function timed-out. Negative number indicates error. |

FLUSH

| | |
|---|---|
| Syntax: | sword odlFlush (uword fd); |
| Function: | This function flushes any buffered input or output. A call to odlFlush will perform the following operations:<br>1. Verify that the fd is valid.<br>2. Call the flush function that is referenced in the FDT for this entry with the buffer and size passed in by the calling procedure. The fd will be replaced with the fd found in the main FDT for this instance of this device.<br>3. Return the return code that was returned from call to device specific flush operation. |
| Input: | fd - File descriptor to be flushed. |
| Output: | None |
| Return: | Zero on success or a negative error code if unsuccessful. |

INIT

| | |
|---|---|
| Syntax: | sword odlInit(void); |
| Function: | Used to initialize library before applications start making calls to the odl. |
| Input: | None |
| Output: | None |
| Return: | Zero on success or a negative error code if unsuccessful. |

SHUTDOWN

| | |
|---|---|
| Syntax: | sword oldShutdown(void); |
| Function: | Used to clean up resources created in odlInit. |
| Input: | None |
| Output: | None |
| Return: | Zero success or a negative error code if unsuccessful. |

Figure 8:
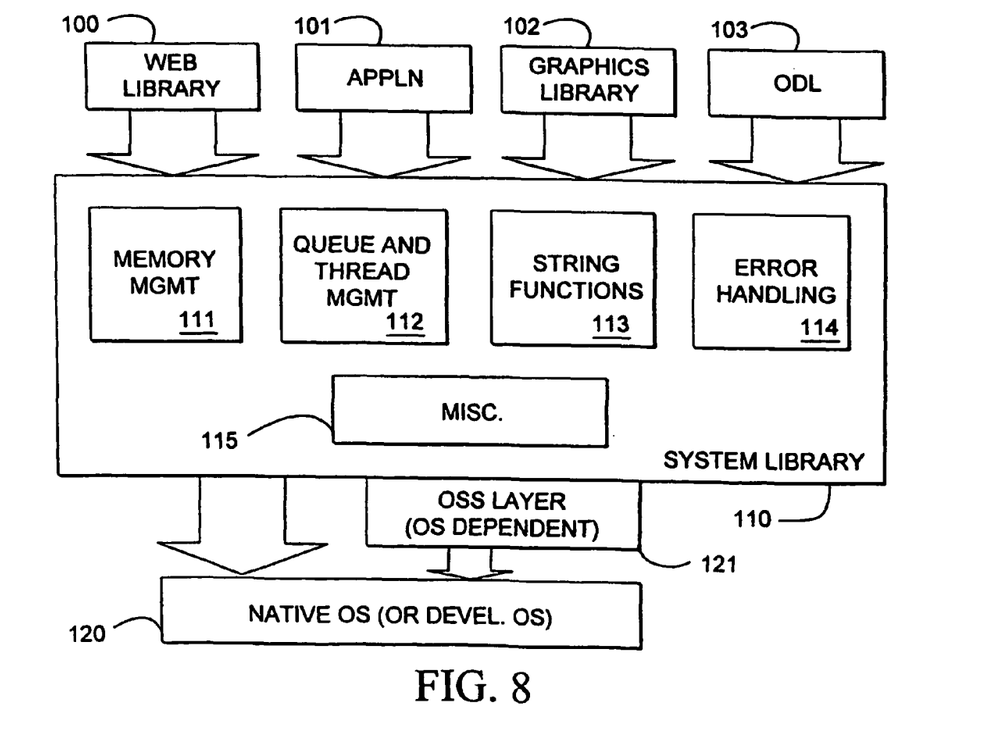
FIG. 8 is a simplified diagram of the system library layer of the application foundation of the present invention.

FIG. 8 provides a simplified diagram of the system library 110, according to the present invention. System library 110 is used in conjunction with the web library 100, the application 101, the graphics library 102, and the ODL 103. The system library 110 includes memory management functions 111, queue and thread management functions 112, string functions 113, and error handling processes 114. Also, miscellaneous items 115 are included in the system library 110. System library 110 is coupled with a native operating system 120 and an operating system support layer 121. The native operating system 120 may be replaced by a development operating system, as mentioned above, for use during application development on a general purpose workstation. The native operating system consists of a standard kernel system, like pSOS, or alternatively a special purpose kernel for the hardware platform being utilized. A development operating system can be any one of a variety of systems, including UNIX-type systems, and windows-type systems.

The OSS layer 121 provides an abstraction function for taking care of the operating system dependent operations for the system library layer and layers above the operating system 120. The OSS layer 121 includes items like data-type specifications, network port functions, flash memory code, domain name server (DNS) functions, and the like.

The system library 110 is static from platform to platform. It provides threading functions, such as functions used to create and delete threads. It provides registration functions that allow the higher layer modules, such as the AGL 51, to register with system library 110 and keep pointers to registered applications.

The memory management function 111 provides for management of the flow of data from the information source to the application program. It includes caching functions and the like, as mentioned above. The queue and threading management functions 112 provide for registration of applications with the threads, context registry, and a notification function. The error handling functions 114 provide for exception handling in a manner similar to the C++ exception handling processes known in the art. Thus, catch and throw error handling routines set up a try region and a catch region in memory.

The string functions 113 are set up to handle classic string processes for development of computer programs. Other miscellaneous functions are handled in the system library 110, which are necessary to support a robust application foundation.

As mentioned above, the system library includes memory management functions. By consolidating memory management functions at the system library level, development of applications for special purpose platforms is greatly facilitated. Furthermore, to manage small memory resources, which the typical information appliance manages, an efficient and unified memory management function is required.

The OSS layer 121 provides an abstraction function between the system library, in the higher level modules, such as the web library 100, application 101, graphics library 102, and ODL 103, and the native operating system and platform of the appliance. The abstraction layer localizes the operating system and platform dependent parameters and functions in the code, in order to move the application foundation from a development platform, such as a high end workstation running a robust full-function operating system, to the application-specific platform of the appliance. The only changes that need to be made occur in the OSS layer 121.

An example OSS layer for a general purpose operating system may be a LINUX UNIX. Other high function, general purpose systems may be used, like Sun Solaris, UNIX, or Windows NT. As can be seen, the system library, web library, application, graphics library, opaque device library, and other modules developed on the application foundation, can be moved from a development platform to an application optimized platform without modification, because of the abstraction function provided by the OSS layer.

Figure 9:
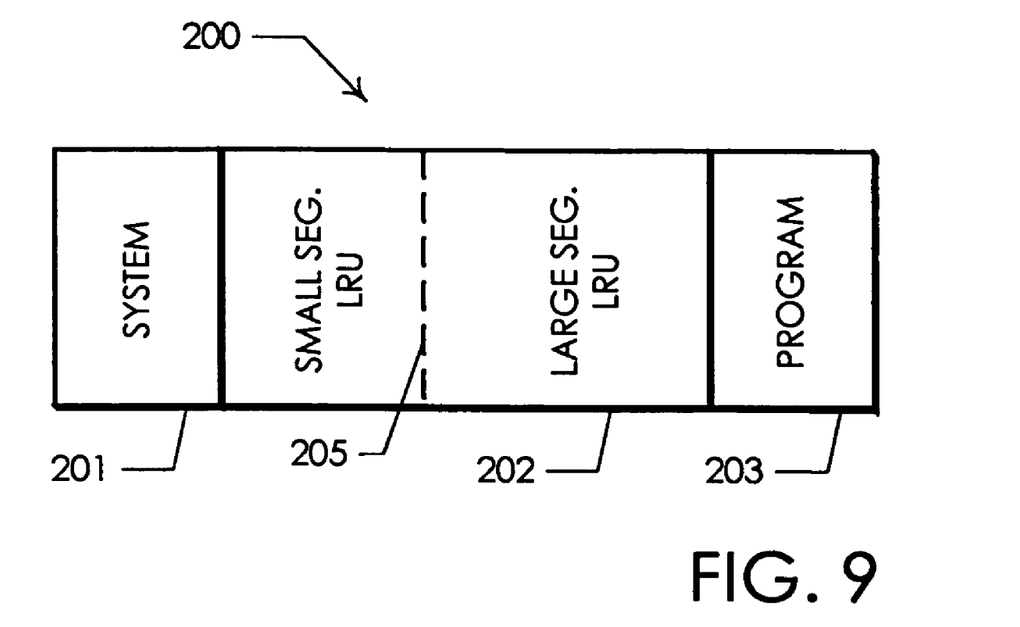
FIG. 9 is a simplified memory organization diagram for the memory management software according to the present invention.

FIG. 9 illustrates a memory map for a section of memory 200, which is under the control of the memory management function. The memory 200 includes a system heap 201, a program heap 203, and a least recently used (LRU) heap 202. System heap 201 is used for memory allocated once and which must remain in existence for long periods of time. Memory from system heap 201 is considered permanent and used for data to be freed under very rare circumstances. Allocation of system heap memory is fast and efficient in packing memory. To free or reallocate memory in system heap 201 is expensive and fragmentation may occur quickly if the memory is often reallocated. The system heap 201 takes priority over program heap 203 and LRU heap 202 and if required, will grow by taking memory from the LRU heap 202 and program heap 203. Program heap 203 is used for memory needed for relatively short periods of time, which may be reallocated and freed on a regular basis. Allocation of memory in program heap 203 is more expensive than in system heap 201 and allocations will occupy more space for bookkeeping purposes. Allocations to program heap 203 are required to be moveable, and are based on a handled memory technique. During the allocation and reallocation process, only handles are returned and used by the application for accessing the allocated memory. All accesses to the memory are made via the handle, since the allocation can be relocated at any time. Freeing memory and reallocating memory in this space are not a problem and fragmentation is minimized. Program heap 203 takes priority over LRU 202 heap, and will grow by taking memory from LRU heap 202.

LRU heap 202 is used for data which can be lost by the application program without catastrophic results. Thus, memory retrieved from the web or other information source, which can be retrieved again, is suitable for use in LRU heap 202. In other words, things allocated to LRU heap 202 are expendable and may be freed by the system at any time independent of the application. Accesses to the memory within LRU heap 202 are performed via a handle. The handle contains the current address of the storage after the memory has been pinned. If allocation is pinned, then it is guaranteed that the memory will not be freed or reallocated. Memory is recycled based on a LRU basis for each priority of memory. For instance, the oldest memory allocated with a priority low is generally freed before any memory allocated at priority medium.

In the preferred embodiment, LRU heap 202 includes a segment for small data elements, such as text, and a segment for large data element, such as graphics pages from world wide websites. These portions of the LRU heap 202 are separated from a boundary 205. Boundary 205 has a fixed position relative to the width of LRU heap 202 in one embodiment. In an alternative embodiment, boundary 205 is dynamically altered depending on the dynamics of the traffic using LRU heap 202.

To use the memory manager in the system library, the application calls functions include the following:

| SysAlloc | |
|---|---|
| Syntax: | void * dslmemSysAlloc (ub4 size, ub4 flags, char *comment); |
| Function: | Allocate "permanent" memory from the System Heap. This will keep critical memory sections separate from the application space. |
| Input: | size - size of allocation |
| | flags - SLMEMCLR if memory should be cleared |
| | comment - up to 8 chars, describing allocation (null term) |
| Output: | None |
| Return: | Pointer to memory allocated, null if out of memory. |
| SysFree | |
| Syntax: | sword slmemSysFree (void *mem,char *comment); |
| Name: | MEM System Heap Free |
| Function: | Free memory allocated by memSysAlloc. After this operation, *mem is no longer accessible. |
| Input: | mem - pointer to the memory allocate |
| | comment - should be same when allocated, can be null |
| Output: | None |
| Return: | 0 if no error, error code otherwise |
| PgmAlloc | |
| Syntax: | slmemPgmAlloc(ub4 size, ub4 flags, char *comment); |
| Name: | MEM Program Handled Allocate |

-continued

| | |
|---|---|
| Function: | Allocate memory from the Program Heap, memory must be accessed via the returned handle. |
| Input: | size- of allocation<br>flags - see above<br>comment - up to 8 chars, describing allocation (null term) |
| Output: | None |
| Return: | Handle to memory allocated, null if out of memory. |

PgmRealloc

| | |
|---|---|
| Syntax: | slmemHandle slmemPgmRealloc( ub4 size, slmemHandle *h, char *comment); |
| Name: | MEM Program Handle'ed Reallocate |
| Function: | Reallocate space that was previously allocated using PgmAlloc. If size is 0, memory is freed. If size is larger than previously, the, contents are copied to the new allocation with the added area nulled out. If the size is smaller, then the contents are copied and truncated. |
| Input: | size - new size of allocation<br>h - handle to the current allocation<br>comment - should be same when allocated, can be null |
| Output: | None |
| Return: | Handle to memory allocated, null if out of memory |
| [NOTE: | If out of memory condition occurs, then the old memory location is still valid with memory contents intact.] |

PgmFree

| | |
|---|---|
| Syntax: | sword slmemPgmFree( slmemHandle *h, char *comment); |
| Name: | MEM Program Handle'ed Free |
| Function: | Free memory allocated by slmemPgmAlloc. After the free, **handle is no longer accessible. The handle is also freed by this operation so no explicit free is required on the handle and the handle can no longer be used. |
| Input: | h - handle of the pointer to the memory allocated<br>comment - should be same when allocated, can be null |
| Output: | None |
| Return: | None |

LruAlloc

| | |
|---|---|
| Syntax: | slmemLruAlloc( ub4 size, slLruPriority priority, ub4 flags, char *comment); |
| Name: | MEM LRU Heap Allocate |
| Function: | Allocate memory from the LRU heap. Note, memory must be relocatable (i.e. no pointers referencing the contents or self-referential pointers) and must be free-able by the system when not pinned. The returned handle is for memory already pinned and accessible. |
| Input: | size - size of allocation<br>priority - one of slLruPriority<br>flags -<br>comment - up to 8 chars, describing allocation (null term) |
| Output: | None |
| Return: | Handle to pinned memory, null if out of memory. |

LruPin

| | |
|---|---|
| Syntax: | sword slmemLruPin( slmemHandle h); |
| Name: | MEM LRU Pin in a memory allocation |
| Function: | Pins memory previously allocated and if successful returns a valid pointer to the memory in the handle. This operation can be performed more than once without a LruRelease occurring and no harm is done. |
| Input:. | valid pointer to a handle returned by LruAlloc |
| Output: | None |
| Return: | 0 if successful, error if not |

LruRelease

| | |
|---|---|
| Syntax: | sword slmemLruRelease( slmemHandle *h); |
| Name: | MEM LRU Release a memory allocation |
| Function: | Unpins memory previously allocated by LruAlloc and if successful nulls out the memory pointer within the handle. This operation can be performed more than once without a LruPin occurring and no harm is done. |
| Input: | handle - a valid pointer to a handle returned by LruAlloc |
| Output: | None |
| Return: | 0 if successful, error if not |

LruFree

| | |
|---|---|
| Syntax: | sword slmemLruFree( slmemHandle *h, char *comment); |
| Name: | MEM LRU Free |
| Function: | Free memory and handle allocated by slmemLruAlloc. After freeing, handle pointer is no longer valid as well as the memory pointed to by the handle. The handle may be pinned or unpinned. |
| Input: | h- a valid pointer to handle returned by LruAlloc<br>comment - should be same when allocated, can be null |
| Output: | None |
| Return: | 0 if successful, error if not |

-continued

Init

| | |
|---|---|
| Syntax: | sword slmemInit(size_t memAvail, ub4 handles, ub4 flags ); |
| Name: | MEM Initialize |
| Function: | Initialize the memory manager. Must be called before any mem functions are called. |
| Input: | memAvail - if 0 use oss call to find amount of memory on device, otherwise memAvail is number of K bytes available for use by mem. |
| Output: | None |
| Return: | 1 - fatal initialization error, <br> 0 - otherwise |

HeapDump

| | |
|---|---|
| Syntax: | void slmemHeapDump( sword heap, sword level); |
| Name: | MEM Dump Heaps |
| Function: | Dumps information about heaps to stdout. This routine should be callable from the debugger so don't add any arguments that are hard to specify. |
| Input: | heap - which heap to dump <br> level - level to dump (0 = minimal, 99 = all) |
| Output: | None |
| Return: | None |

Thus, in the memory management module of the SL, the memory allocated to the system is divided up into three heaps. A heap is essentially a section of memory which is subdivided into smaller allocation units which can be allocated and deallocated in any order. The small allocation units are called pages. The size of a page is dependent on the operating system and the underlying hardware and is defined by constant OSS-MEMPAGSZ. In one particular example, OSSMEMPAGSZ is set to 4K (4096) bytes. The heaps are typically implemented as a doubly-linked list of page records with additional information in each page record indicating how much of the page is allocated and an allocation list for the memory contained within the page. In addition, there are various pointers that are used for traversing the list. The three heaps used are the SYS heap, initially set to 300 pages, the PGM heap, initially set to 500 pages and the LRU heap, initially set to 300 pages. The LRU heap is treated by the system as two separate heaps: the small LRU heap and the large LRU heap. Allocations of memory chunks exceeding one page size, in this case, exceeding 4K, are done from the large LRU heap. Allocations of memory sections smaller than or equal to 4K are satisfied out of the small LRU heap. The two subheaps then grow towards each other until the LRU heap is exhausted.

The SL commands include extended service routines for memory management. Using SL calls, pages can be allocated, freed, or reallocated within any heap. Each heap has its own specific SL routines for allocating and freeing pages. The SL page allocation routines return a handle to the calling program which can be used to address that particular page.

System routines and application programs allocate memory in a heap by calling the SL allocation routine for that heap. For example, in the SYS heap, memory allocation is handled by a routine called SYSALLOC. The calling program provides SYSALLOC with the size of the memory segment required and control flags. SYSALLOC deals with allocating new pages, or using existing pages when appropriate, and returns the address of a data structure located in the requested heap and having the amount of storage requested by the calling program. Note that the calling program is not directly involved with managing pages. Other heaps have similar routines for performing the same function. Additional SL routines deal with scanning each heap for unused sections of memory and performing garbage collection when necessary to consolidate unused memory sections into larger sections, concatenating used memory sections, when possible, and maintaining the data structure that indicate which section of each page is in use.

The system is designed to work in both single and multi-tasking environments. When working in a multi-tasking environment, the memory routines lock the global context which prevents other threads requesting memory allocation or deallocation services while a request is being processed. Once the memory operation is completed, the global context is unlocked.

The application kernel also provides various SL routines for scanning and validating the allocations to guard against accidental corruption of the information stored in the various memory locations addressed by the handles used by the application program.

Each heap also has a SL reallocation routine that resizes an existing allocation by either reducing or increasing the size of the memory segment associated with the allocation. Reallocation may be used to accommodate a smaller amount of storage by freeing unused memory, or more challengingly, to increase the size of an existing allocation. The reallocation routines can allocate additional memory on the same page as the existing allocation. If sufficient free memory is not available on the current page, additional pages may be allocated to accommodate the request for additional memory for a particular allocation. This allows the size of individual allocation to be dynamically adjusted as the application program requires without having to delete the contents, allocating a new memory section and copying the values from the old section to the new section.

The SL routines that provide page operations also provide the ability to dynamically resize the heaps when the number of free pages in that heap falls below a threshold. This is called "Stealing Pages". The page stealing or dynamic reallocation basically involves adjusting the starting point of a heap that is running low on free pages such that a certain number of free pages from the end of one heap is transferred to the beginning of the next. For example, when the SYS heap is running low, pages can be stolen from the LRU heap. The routine that performs this operation is PAGESTEAL and it performs the appropriate checks to make sure that the pages that are being stolen are not already in use and to make all the appropriate adjustments to pointers such that the memory handles used by the application programs will continue to point to the correct data in the appropriate place in memory. Likewise, the PGM heap can steal pages from the large LRU using the same procedure and making the appropriate adjustments. The page stealing operation for the PGM heap is also done by the above mentioned routine.

In summary, the information appliance architecture of the present invention is based on a function-specific hardware platform on which it is coupled with an application foundation software and an information appliance application. The present invention provides an application foundation which is the first platform designed from the beginning for the creation of information appliances. The primary purpose of the application foundation is to provide an easy to use and portable environment for information appliance application development and deployment. The present invention enables a new class of consumer appliances for home, schools, and offices that provide access to information sources in low cost, small footprint, highly reliable appliances. The appliances blend intuitive ease of use, convenience and affordability of consumer appliances, with the power of computers, to make electronic information far more accessible.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An information appliance, comprising:
    a processor;
    working memory coupled to the processor; and
    non-volatile memory coupled to the processor and storing appliance operating software and application software, wherein the appliance operating software includes logic executed by the processor to manage information flow from an information source through the working memory to a display, and the application software includes logic executed by the processor that manages selection of information from the information source; wherein the appliance operating software further comprises:
        an operating system kernel that is adapted for the processor; and
        a system library including logic that provides an interface to the application software and implements memory management functions, wherein an operating system service layer provides an abstraction function between the system library and the appliance operating system kernel and hardware.

2. The information appliance of claim 1, wherein the logic in the system library is executable with a development platform operating system that is separate from the operating system of the appliance.

3. The information appliance of claim 1, wherein the system library provides error handling functionality.

4. The information appliance of claim 3, wherein the error handling functionality comprises classifying errors as user errors or system exceptions.

5. The information appliance of claim 1, wherein the memory management functions comprise classifying a portion of the working memory according to a system memory category, a program memory category, or at least recently used memory category.

6. The information appliance of claim 1, wherein the system library provides threading functions.

7. The information appliance of claim 1, wherein the system library provides registration functions.

8. The information appliance of claim 1, wherein the memory management functions manage flow of data from the information source.

9. The information appliance of claim 1, wherein the memory management functions include data caching functions.

10. The information appliance of claim 1, wherein the information source comprises Internet accessible information, and wherein the appliance operating software includes Internet access logic, and the application software includes an Internet browser.

11. The information appliance of claim 1, wherein the information source comprises a mass storage device.

12. The information appliance of claim 1, wherein the information source comprises Internet accessible electronic mail, and wherein the application software includes electronic mail logic.

13. The information appliance of claim 1, wherein the information appliance is a single purpose computer-like application for delivering a specific application.

14. The information appliance of claim 1, wherein the working memory comprises a system heap, a program heap, and at least recently used heap.

15. An information appliance, comprising:
    a processor;
    working memory coupled to the processor; and
    non-volatile memory coupled to the processor and storing appliance operating software and application software, wherein the appliance operating software includes logic executed by the processor to manage an information flow from an information source through the information appliance, and further wherein the application software includes logic executed by the processor that manages selection of information from the information source, wherein the appliance operating software further comprises:
        an operating system kernel that is adapted for the processor; and
        a system library including logic that provides an interface to the application software, wherein an operating system service layer provides an abstraction function between the system library and the operating system kernel.

16. An information appliance, comprising:
    a processor;
    working memory coupled to the processor; and
    non-volatile memory coupled to the processor and storing appliance operating software and application software, wherein the appliance operating software includes logic executed by the processor to manage an information flow from an information source through the information appliance, and the application software includes logic executed by the processor that manages selection of information from the information source, wherein the appliance operating software further comprises:
        an operating system kernel that is adapted for the processor; and
        a system library including logic that provides an interface to the application software and implements memory management functions, wherein the logic in the system library is executable with a development platform operating system that is separate from the operating system kernel.

17. The information appliance of claim 16, wherein the memory management functions comprise classifying a portion of the working memory according to a system memory category, a program memory category, or at least recently used memory category.

18. The information appliance of claim 16, wherein the memory management functions manage flow of data from the information source.

* * * * *